US012450104B2

(12) United States Patent
Nip et al.

(10) Patent No.: US 12,450,104 B2
(45) Date of Patent: Oct. 21, 2025

(54) MULTIPLE LOCKING OF RESOURCES AND LOCK SCALING IN CONCURRENT COMPUTING

(71) Applicant: CrowdStrike, Inc., Sunnyvale, CA (US)

(72) Inventors: Alexander Nip, Redmond, WA (US); Milos Petrbok, Redmond, WA (US)

(73) Assignee: CrowdStrike, Inc., Sunnyvale, CA (US)

( * ) Notice: Subject to any disclaimer, the term of this patent is extended or adjusted under 35 U.S.C. 154(b) by 380 days.

(21) Appl. No.: 17/385,902

(22) Filed: Jul. 26, 2021

(65) Prior Publication Data

US 2023/0025760 A1    Jan. 26, 2023

(51) Int. Cl.
  *G06F 9/46* (2006.01)
  *G06F 9/50* (2006.01)
  *G06F 9/52* (2006.01)

(52) U.S. Cl.
  CPC ............. *G06F 9/52* (2013.01); *G06F 9/505* (2013.01); *G06F 9/5072* (2013.01); *G06F 9/5077* (2013.01)

(58) Field of Classification Search
  CPC .......... G06F 9/52; G06F 9/505; G06F 9/5072; G06F 9/5077; G06F 9/526
  See application file for complete search history.

(56) References Cited

U.S. PATENT DOCUMENTS

| 5,852,664 | A | * | 12/1998 | Iverson | H04N 7/1675 |
| | | | | | 340/5.31 |
| 6,144,983 | A | * | 11/2000 | Klots | G06F 9/52 |
| | | | | | 718/104 |
| 7,653,722 | B1 | * | 1/2010 | Krishna | H04L 43/04 |
| | | | | | 709/224 |
| 2003/0076959 | A1 | * | 4/2003 | Chui | H04N 19/635 |
| | | | | | 380/277 |
| 2007/0022084 | A1 | * | 1/2007 | Cohen | H04L 45/745 |

(Continued)

FOREIGN PATENT DOCUMENTS

CN      106126673 A  * 11/2016 ............. G06F 16/27

*Primary Examiner* — April Y Blair
*Assistant Examiner* — Zhi Chen
(74) *Attorney, Agent, or Firm* — Lee & Hayes, P.C.

(57) ABSTRACT

Methods and systems for implementing division of process resources of running processes into individually locked partitions, and indirect mapping of keys to process resources to locks of each partition, are provided. In computing systems implementing concurrent processing, applications may generate and destroy concurrently running processes with high frequency. Real-time security monitoring may cause the computing system to run monitoring processes collecting large volumes of data regarding system events occurring in context of various other processes, causing threads of processes of the security monitoring application to make frequent write access and read access to resources of those processes in memory. Indirect mapping of lock acquisition across locks provides scalable alleviation of lock contention and thread blocking that result from computational concurrency, while handling read and write requests which arise at unpredictable times from kernel-space monitoring processes, and which request unpredictable resources of monitored user-space processes.

12 Claims, 13 Drawing Sheets

(56) References Cited

U.S. PATENT DOCUMENTS

| | | | | |
|---|---|---|---|---|
| 2008/0086470 | A1* | 4/2008 | Graefe | G06F 16/2246 |
| 2008/0256074 | A1* | 10/2008 | Lev | G06F 9/466 |
| 2010/0275209 | A1* | 10/2010 | Detlefs | G06F 9/526 |
| | | | | 710/200 |
| 2012/0323972 | A1* | 12/2012 | Ostrovsky | G06F 16/9014 |
| | | | | 707/E17.044 |
| 2016/0328435 | A1* | 11/2016 | Kavanagh | G06F 16/1767 |
| 2017/0318119 | A1* | 11/2017 | Zbiljic | G16B 50/30 |
| 2017/0371578 | A1* | 12/2017 | Wu | G06F 9/467 |
| 2018/0217878 | A1* | 8/2018 | Loh | G06F 9/526 |
| 2019/0317746 | A1* | 10/2019 | Liu | G06F 9/4856 |
| 2020/0034308 | A1* | 1/2020 | Shveidel | G06F 3/0622 |

* cited by examiner

MULTIPLE LOCKING OF RESOURCES AND LOCK SCALING IN CONCURRENT COMPUTING

BACKGROUND

As computing workloads constantly increase in the development of computing systems, not only processing power, but throughput should be improved concomitantly so that computing system specifications can keep pace with growing workloads. It is well-known that concurrent computing, wherein a computing system executes instructions in parallel across multiple processors and multiple cores of the same processors, may enable expansion of computational capacity of computing systems by increasing computational throughput.

On multi-processor, multi-core computing systems, computing threads may run on different processors, and different cores of same processors, so that different sets of instructions may be executed concurrently. However, the logic of conventional computer programs requires at least some instructions thereof being executed serially in order, so that resources read or written to by those instructions are maintained in consistent states and are not modified by multiple threads independent of each other. Thus, implementations of concurrent computing generally utilize locks, wherein a thread modifying a resource (referred to as a critical section) may acquire a lock over the critical section to prevent other threads from modifying the critical section for a duration of time.

In order to resolve contention for a same critical section among multiple threads, computing systems implementing concurrent processing further implement thread waiting, where any threads seeking to acquire a lock already acquired by another thread must enter a waiting state until the lock may be acquired. Such waiting results in degradation of computing throughput, as workloads become increasingly queued; moreover, such degradation of throughput cannot necessarily be mitigated by increased processing power, which may simply result in a greater number of processors, cores, and threads contending for the same resources.

Consequently, it is desired to manage the degree of contention occurring at locks in computing systems implementing concurrent processing, to mitigate the degradation of computational throughput as computing workloads grow ever greater.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
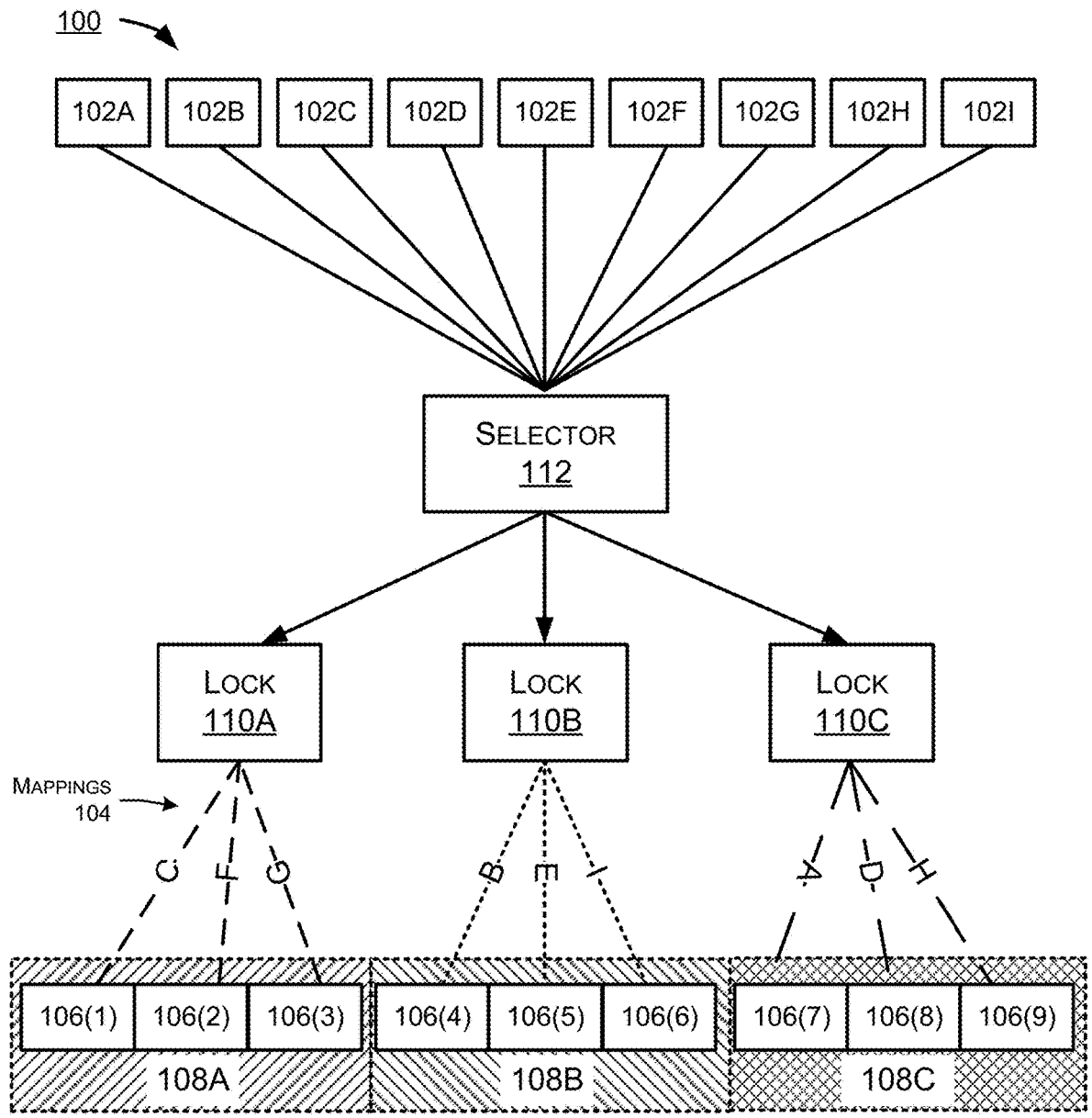
FIGS. 1 and 2 illustrate implementation of locks over a logical organization of a table according to examples of the present disclosure.

Systems and methods discussed herein are directed to implementing multiple locking of resources in concurrent computing, and more specifically dividing process resources of running processes into individually locked partitions, and indirectly mapping keys to process resources to locks of each partition.

A processor of a computing system according to examples of the present disclosure may load one or more computer-executable instructions into memory of the computing system, and execute the one or more computer-executable instructions as a process (one or more regions of memory allocated for executing a process subsequently referred to as "process memory"). While executing the process, one or more processors of the computing system may execute various sets of computer-executable instructions of the process as individual threads of execution, where multiple processors or multiple cores of a same processor may execute different threads concurrently. Resources may further be shared between multiple processes, and all threads running in those multiple processes.

The process additionally stores process resources in corresponding process memory of the process (this data being subsequently referred to as one or more "process data segments"). By storing process resources in memory rather than on non-volatile storage, the process may access the process resources more quickly than data stored in non-volatile storage. All threads of a process may access process memory of the process, and all threads of the process may access process data segments stored in the process memory. During execution of computer-executable instructions thereof, threads may require read access and write access to resources stored in process memory.

Resources according to possible examples of the present disclosure should be understood as including, without limitation, data records, data stores, data objects, data blobs, and the like, written and read by computer-executable instructions to track states required for computations performed by those instructions. Resources according to possible examples of the present disclosure may be generally understood as being logical data structures, containers, and the like (such as key-value stores, dictionaries, registries, etc.) mapped to certain physical addresses on storage devices of a computing system; such mappings enable the resources to be accessed while hiding the underlying physical locations of the resources.

Process resources storing the state of a running process are referred to as the context of the process.

For example, computer-executable applications may provide real-time security monitoring on a computing system, by tracking computational activity of other applications running on the same computing system. Data obtained by tracking such computational activity may be analyzed in real-time to identify malicious activity and perform remediation in response. For the purpose of understanding examples of the present disclosure, details of such real-time security monitoring need not be elaborated in detail. It shall suffice to understand that in computing systems implementing concurrent processing, applications may generate and destroy concurrently running processes with high frequency, and monitoring of such short-lived processes may concurrently cause read access and write access to large quantities of data.

Such real-time security monitoring may cause the computing system to run monitoring processes collecting large volumes of data regarding system events occurring in context of various other processes, causing threads of processes of the security monitoring application to make frequent write access and read access to resources of those processes in memory.

Since a computing system according to examples of the present disclosure may concurrently execute multiple threads which may request access to the same process data segments at the same time, such computing systems also implement locks to enforce exclusive access to resources of processes in memory. Exclusive access generally means that access to resources is synchronized across threads so that no more than one thread may access the same resource at the same time. In this fashion, the computing system may prevent data corruption or errors that would result from more than one thread writing to the same resource at the same time.

Locks and synchronization enforce exclusive access when one thread acquires a lock for a resource, causing all other threads of the same process requesting write access to the same resource to become blocked. However, under conventional implementations of locks and synchronization, exclusive access causes lock contention (the phenomenon of one thread attempting to acquire a lock currently acquired by another thread), and results in thread-blocking (when computation by a first thread cannot proceed without a resource whose lock is acquired by a second thread, the first thread must wait). The more concurrent computation is performed by multiple threads of the same process, the more lock contention and the more thread-blocking results, where a single lock acquisition may cause multiple threads to become blocked; as a consequence, under conventional implementations of locking, every lock acquisition may become a computational bottleneck for threads and processes that share resources.

Designers of some computer-executable applications, such as databases, have sought to solve computational bottlenecks introduced by locking resources at highly granular levels, and by load-balancing requests. However, such solutions do not universally fit all applications which require locking. For example, real-time security monitoring applications create processes which frequently require concurrent access to their own contexts, due to performing the function of monitoring contexts of other processes running on a same computing system.

Consequently, since the monitored processes run independently, generating activity patterns which are often unpredictable, monitoring processes must create a data store reflecting all kinds of activity occurring in real time. Thus, monitoring processes require timely read and write access to unpredictable quantities of process data at unpredictable times, and furthermore must perform computations based on the process data on a timely basis. Consequently, granular locking cannot be applied to resources to be accessed by monitoring resources, as there is no guarantee that any given read or write request at any given time will be granular. The requests also cannot be load-balanced or offloaded, as the monitoring processes must run in kernel space of a computing system (while monitored applications run in user space); thus, system services available to the monitoring processes are substantially limited, and the monitoring processes cannot freely communicate data to the full extent of storage available on the computing system.

Consequently, examples of the present disclosure provide indirect mapping of lock acquisition across locks, providing scalable alleviation of lock contention and thread blocking that result from computational concurrency, while handling read and write requests which arise at unpredictable times from kernel-space monitoring processes, and which request unpredictable resources of monitored user-space processes.

For the purpose of understanding examples of the present disclosure, it should be understood that, with reference to a monitoring process of a real-time security monitoring application, process resources may be structured as tables, which logically organize data into records referred to as rows; each record of a table may include one or more values accessible by looking up a unique key.

Figure 2:
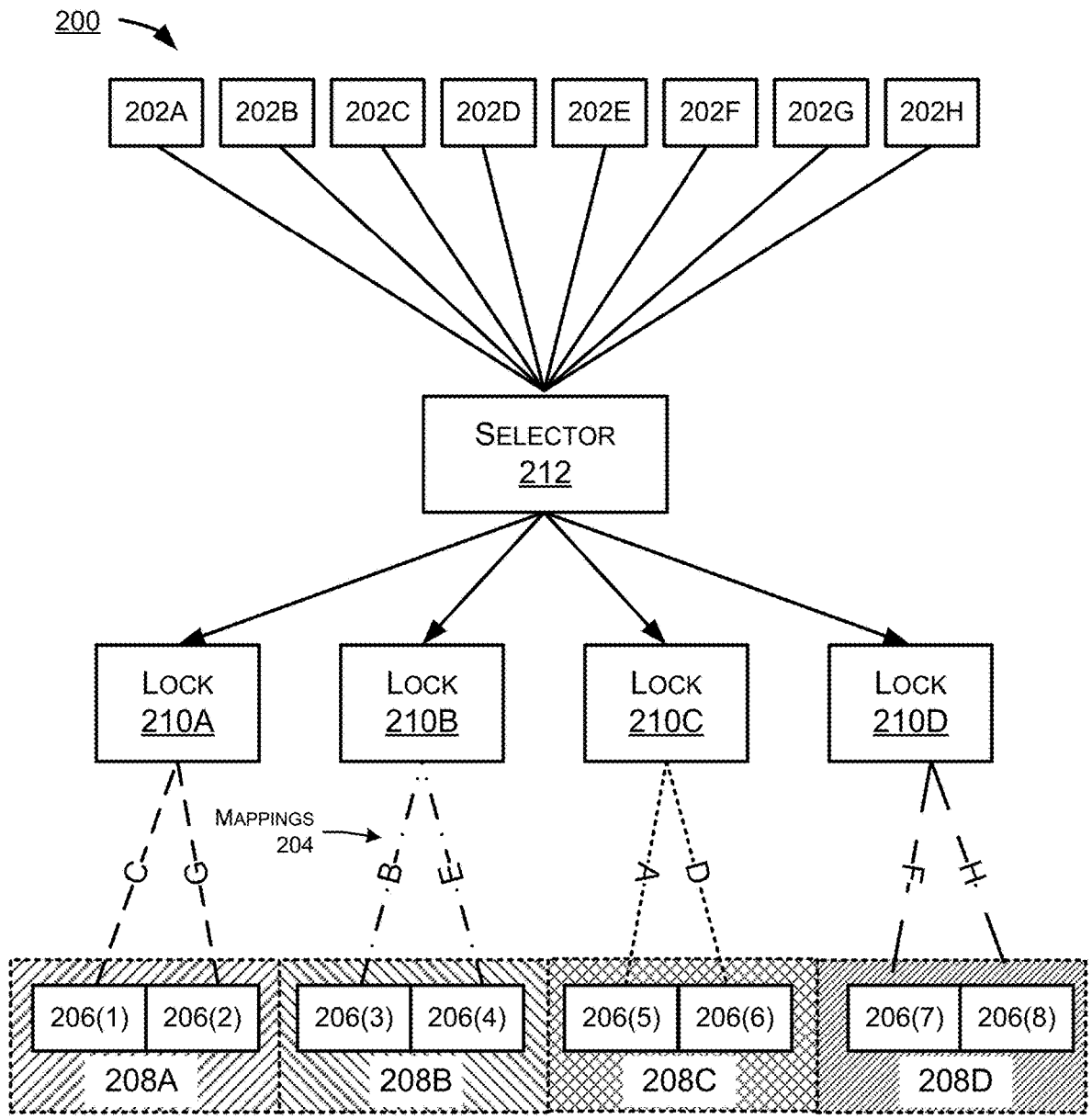

FIGS. 1 and 2 illustrate implementation of locks over a logical organization of a table according to examples of the present disclosure. A table 100 or 200, respectively, includes some number of keys (numbered 102A through 102I in FIG. 1, and numbered 202A through 202H in FIG. 2), each key being unique; each key is illustrated herein as a different alphabetical letter. The table 100 or 200, respectively, further includes mappings 104 or 204 of keys to resources, including one such mapping for each key. The table 100 or 200, respectively, further includes resources 106 or 206. Each resource is illustrated herein numbered 106(1) or 206(1), 106(2) or 206(2), . . . for ease of comprehension.

Each mapping 104 or 204 connects one key to one resource; at the resource side, each mapping is illustrated with the alphabetical letter of its corresponding key, for clarity.

According to conventional implementations, a single lock is implemented over the entire table. The single lock may enforce singular exclusive access to all resources of the table. Herein, singular exclusive access should be understood as meaning that, when any thread acquires the single lock, the lock is acquired for all resources of the table. Consequently, any other thread seeking to acquire the single lock will become blocked, increasing lock contention. Since the lock is implemented over the entire logical table, even if the table does not make up the entirety of process resources, threads of the monitoring process are still likely to concurrently request read and/or write access to some number of resources of the table, resulting in lock contention even while different threads do not request the same resources. Therefore, in the routine operation of a real-time security monitoring application as described above, computational bottlenecks may occur at unpredictable times and with unpredictable frequency, resulting in degraded performance of the computing system in performing security monitoring. Subsequently, implementations of locks over a logical organization of a table according to examples of the present disclosure shall be described in contrast.

It should be understood that the table 100 or 200 is stored in memory of a computing system, and the table 100 or 200 makes up at least part of process resources of a process running on the computing system, including one or more process data segments. The process includes one or more threads which are executed concurrently by one or more processors of the computing system. Each of the one or more threads may request read access and write access to the process resources. The process and the threads are not illustrated herein.

Implementations of keys of the table 100 or 200 according to possible examples of the present disclosure should be understood as including, without limitation, primitive numeric values, unique identifiers (such as Universally Unique Identifiers ("UUIDs") or Globally Unique Identifiers ("GUIDs")), text strings, binary buffers, and the like.

Keys may be stored in register memory of one or more processors of the computing system, so that the keys have higher locality of reference to the processors than all other data stored in the memory but not in register memory. Consequently, requests issued by one or more threads executed by the processors may access the keys more quickly than all other data stored in main memory of the computing system. Since register memory is generally small and fixed in size, keys according to examples of the present disclosure should generally be small and uniform in byte length.

Resources of the table 100 or 200 according to possible examples of the present disclosure should be understood as including, without limitation, data records, data stores, data objects, data blobs, and the like, as described above. Mappings 104 or 204 may map keys to any such resources as contemplated herein or to other suitable data structures as known to persons skilled in the art, without limitation.

Additionally, for the purpose of implementing examples of the present disclosure, resources of a table 100 or 200, collectively, may be subdivided into multiple partitions. In FIG. 1, three partitions 108A, 108B, and 108C are shown for illustrative purposes, while in FIG. 2, four partitions 208A, 208B, 208C, and 208D are shown for illustrative purposes. It should be understood that resources of a table may be subdivided into any arbitrary number of partitions.

Implementations of partitions of the table 100 or 200 according to possible examples of the present disclosure should be understood as including, without limitation, collections, sub-tables (i.e., multiple smaller tables within the table 100 or 200), groups, hosts, data stores (i.e., data stores encompassing smaller data stores making up individual resources), and the like.

It should further be understood that resources of a table may be subdivided in any manner based on physical addressing, such as subdivisions of groups of physically proximal resources in memory, and in any manner based on virtual addressing, such as subdivisions of groups of resources sequential in virtual addressing, and the like.

Each different partition is illustrated herein with a different hatching pattern, for visual distinction. By way of example, partitions 108A, 108B, and 108C are each illustrated with three resources therein, while partitions 208A, 208B, 208C, and 208D are each illustrated with two resources therein. According to different embodiments of the present disclosure, partitions may be designed with varying numbers of resources within each partition depending on computational workload at a computing system running the monitoring process, as shall be described subsequently.

Additionally, not only is each mapping 104 or 204 illustrated with the alphabetical letter of its corresponding key, mappings corresponding to resources of different partitions are also illustrated differently from each other, for clarity. It should be understood that mappings differently-illustrated in this manner are not necessarily different from each other in characteristics.

FIG. 1 further illustrates locks 110A, 110B, and 110C, and FIG. 2 further illustrates locks 210A, 210B, 210C, and 210D. Each of these locks, not being singular, limits only access to resources of one particular partition of the table 100 or 200. According to examples of the present disclosure, one lock may be implemented for each partition of the table 100 or 200. Thus, while one thread has acquired one of the locks, other threads are not blocked from acquiring the other locks over the other partitions.

Implementations of locks over the table 100 or 200 according to possible examples of the present disclosure should be understood as including, without limitation, mutexes, semaphores, spinlocks, distributed locks, and other such locks that enforce exclusive read access and exclusive write access; as well as read-write locks which may enforce exclusive write access without enforcing exclusive read access (i.e., permitting multiple concurrent reads of the same resource by different threads).

Consequently, whenever a thread of the monitoring process makes a write request to a process resource in a table 100 or 200, the thread may acquire one of several locks. However, the thread does not need to determine which of several locks to acquire. As illustrated in FIGS. 1 and 2, while keys are mapped to resources, keys are not directly mapped to locks. Rather, keys may be mapped to resources directly, and dynamically mapped to locks indirectly by a selector 112 or 212. The selector 112 or 212 may include a function which deterministically maps each key of the range of keys found in the table 100 or 200 to one of the several locks, in a manner such that the range of keys is indirectly mapped approximately evenly across the several locks.

For example, the selector 112 or 212 may include a pseudorandom deterministic function, such that each unique key input into the pseudorandom deterministic function always yields the same output. Each output of the selector 112 or 212 may deterministically identify a lock and a partition of the table 100 or 200, so that the input of each different key into the selector 112 or 212 is indirectly mapped deterministically to a key and a partition of the table 100 or 200.

According to examples of the present disclosure, the selector 212 may include a function which has a substantially uniform distribution of output, such that keys are indirectly mapped substantially uniformly across the several keys.

For example, the selector 112 or 212 may include any hash function as known to persons skilled in the art, such as a cyclic redundancy check ("CRC") function.

As FIG. 1 illustrates, the selector 112 indirectly maps nine keys 102A through 102I, each to one of the locks 110A, 110B, and 110C. Three keys are indirectly mapped to each lock, resulting in substantially uniform distribution. Thus, a first thread may acquire lock 110A upon making a write request to any one of the resources mapped to keys 102C, 102F, or 102G; a second thread may acquire lock 110B upon making a write request to any one of the resources mapped to keys 102B, 102E, or 102I; and a third thread may acquire lock 110C upon making a write request to any one of the resources mapped to keys 102A, 102D, or 102H. These three locks may be acquired concurrently without mutually causing thread blocking or lock contention.

As FIG. 2 illustrates, the selector 212 indirectly maps eight keys 202A through 202H, each to one of the locks 210A, 210B, 210C, and 210D. Two keys are indirectly mapped to each lock, resulting in substantially uniform distribution. Thus, a first thread may acquire lock 210A upon making a write request to any one of the resources mapped to keys 202C or 202G; a second thread may acquire lock 210B upon making a write request to any one of the resources mapped to keys 202B or 202E; a third thread may acquire lock 210C upon making a write request to any one of the resources mapped to keys 202A or 202D; and a fourth thread may acquire lock 210D upon making a write request to any one of the resources mapped to keys 202F or 202H. These four locks may be acquired concurrently without mutually causing thread blocking or lock contention.

It should be understood that the above example describes write requests for avoidance of ambiguity, as read requests may or may not cause thread blocking or lock contention, depending on the implementation of locks according to possible examples of the present disclosure. For example, according to the implementation of read-write locks as described above, any number of threads may acquire the same lock for read requests unless any thread has acquired the lock for a write request, and only one thread may acquire the lock for a write request.

As a consequence of substantially uniform distribution of key mappings across locks and across partitions as described above, lock acquisitions according to examples of the present disclosure may be indirectly mapped across multiple partitions of the table 100 or 200. Thus, partitions according to examples of the present disclosure may be designed such that the number of resources in each partition varies depending on computational workload at the computing system running the monitoring application.

For example, on computing systems with high computational workloads and high specifications for available memory, the monitoring application may also incur frequent computational activity; thus, partitions of process resources may be implemented to increase runtime computational performance at the expense of increased memory footprint, by decreasing the number of resources making up each partition (to a minimum of one resource per partition, in some cases).

However, on computing systems with low computational workloads and low specifications for available memory, large memory footprints may be impracticable; thus, partitions of process resources may be implemented to decrease memory footprint at the expense of decreased runtime computational performance, by increasing the number of resources making up each partition (to a maximum of all process resources being under a common partition). Furthermore, lock scaling and partition scaling may be performed concomitantly to cause scaling of partitions, as shall be described subsequently.

Figure 3:
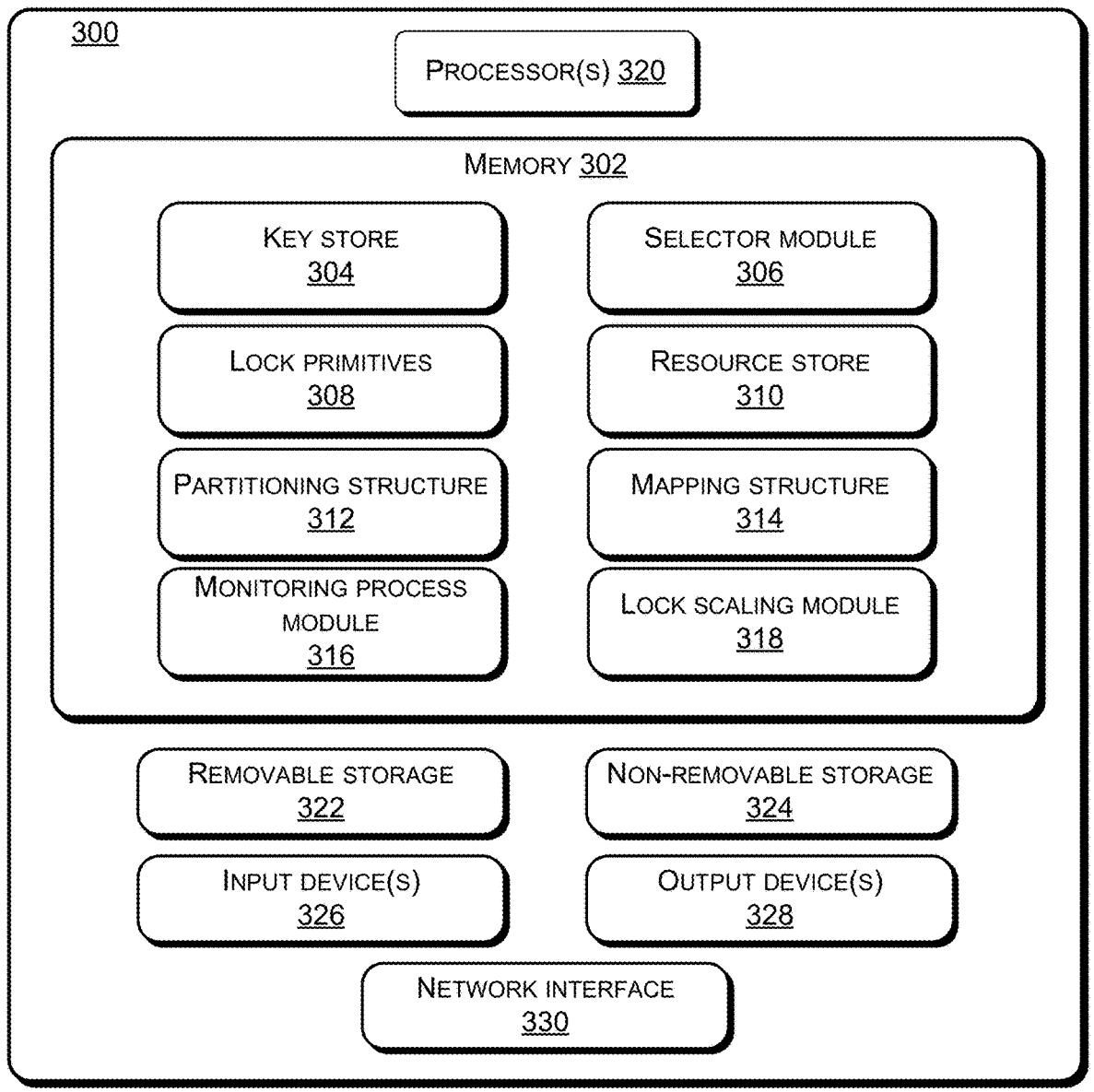
FIG. 3 illustrates a block diagram of one or more computing system(s) according to examples of the present disclosure.

FIG. 3 illustrates a block diagram of one or more computing system(s) 300 according to examples of the present disclosure. One or more computing system(s) 300 according to examples of the present disclosure may correspond to one or more computing system(s) as described with reference to FIGS. 1 and 2 above.

The techniques and mechanisms described herein may be implemented by multiple instances of the computing system(s) 300, as well as by any other computing device, system, and/or environment. The computing system(s) 300 may be one or more distributed system composed of multiple physically networked computers or web servers, a physical or virtual cluster, a computing cloud, or other networked computing architectures providing physical or virtual computing resources as known by persons skilled in the art. The computing system(s) 300 shown in FIG. 3 encompass only one example of one or more system(s) and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, mini-computers, mainframe computers, distributed computing environments that include any of the above systems or devices, implementations using field programmable gate arrays ("FPGAs") and application specific integrated circuits ("ASICs"), and/or the like. By way of example, and without limitation, the computing system(s) 300 can be implemented as various computing systems 300(1), 300(2), ..., 300(N).

As illustrated, the computing system(s) 300 comprises a memory 302 storing a key store 304, a selector module 306, lock primitives 308, a resource store 310, a partitioning structure 312, a mapping structure 314, a monitoring process module 316, and a lock scaling module 318. Also, the computing system(s) 300 includes processor(s) 320, a removable storage 322 and non-removable storage 324, input device(s) 326, output device(s) 328, and network interface 330.

The memory 302 may be communicatively coupled to the processor(s) 320. The processor(s) 320 and memory 302 may be physical or may be virtualized and/or distributed. In embodiments, the processor(s) 320 may include one or more general-purpose processor(s) and one or more special-purpose processor(s). The general-purpose processor(s) and special-purpose processor(s) may be physical or may be virtualized and/or distributed. The general-purpose processor(s) and special-purpose processor(s) may execute one or more instructions stored on a computer-readable storage medium as described below to cause the general-purpose processor(s) or special-purpose processor(s) to perform a variety of functions. General-purpose processor(s) may be computing devices operative to execute computer-executable instructions, such as Central Processing Units ("CPUs"). Special-purpose processor(s) may be computing devices having hardware or software elements facilitating computation of special-purpose computing tasks. For example, special-purpose processor(s) may be accelerator(s), such as Graphics Processing Units ("GPUs"), implementations using FPGAs and ASICs, and/or the like. Additionally, each of the processor(s) 320 may possess its own local memory (which may include, for example, register memory as described above), which also may store program modules, program data, and/or one or more operating systems.

Depending on the exact configuration and type of the computing system(s) 300, the memory 302 may be volatile, such as RAM, non-volatile, such as ROM, flash memory, miniature hard drive, memory card, and the like, or some combination thereof. The memory 302 may include one or more data stores, data structures, and primitives, as well as computer-executable modules as described above and in further detail subsequently that are executable by the processor(s) 320.

A selector module 306, a monitoring process module 316, and a lock scaling module 318 stored in the memory 302 may each comprise methods, threads, processes, applications or any other sort of executable instructions. A monitoring process module 316, during execution, may create one or more monitoring processes and one or more process resources accessible by threads of the monitoring processes in process memory allocated to the processes.

Process resources may include, for example, the key store 304, the lock primitives 308, the resource store 310, the partitioning structure 312, and the mapping structure 314. The key store 304 includes some number of keys, each key being unique. The mapping structure 314 includes mappings of keys to resources of the resource store 310, including one such mapping for each key. Each mapping connects one key to one resource. All process resources may reside in the memory 302 except that the key store may reside in local memory of processor(s) 320.

According to examples of the present disclosure, the computer-readable memory 302 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 302 may also be described as computer storage media or non-transitory computer-readable media, and may include volatile and nonvolatile, removable and non-removable media implemented in any method or technology for storage of information, such as computer readable instructions, data structures, program modules, or other data. Computer-readable storage media (or non-transitory computer-readable media) include, but are not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, and the like, which can be used to store the desired information and which can be accessed by the computing system(s) 300. Any such memory 302 may be part of the computing system(s) 300.

According to examples of the present disclosure, the selector module 306 may configure the computing system(s) 300 to, based on a function which deterministically maps each key of a range of keys recorded in the key store 304 to one of several locks among the lock primitives 308, in a manner such that the range of keys is mapped in a fashion distributed approximately evenly across the several locks. For example, a selector module may correspond to the selector 112 or 212 as described above with reference to FIGS. 1 and 2.

According to examples of the present disclosure, the monitoring process module 316 may configure the computing system(s) 300 to create one or more kernel-level processes which monitor computational activity of user-space applications. The monitoring processes may, based on the monitored activity, record data in the process resources and read previously recorded data from the process resources. Resources may be accessed by reference to mappings between keys and resources as described above. The monitoring processes may record data in real time as activity is observed, and may read previously recorded data for various purposes such as comparing currently observed activity with previously observed data, to determine safe and abnormal activity patterns.

For example, the monitoring processes may configure the computing system(s) 300 to identify whether observed activity patterns indicate malicious attacks. An activity pattern may be classified at a various severity levels depending on, for example, closeness of matching against clearly suspicious activity patterns or closeness of matching against clearly non-suspicious activity patterns. For these reasons, the monitoring processes may frequently make read and write requests to process resources, and detection of suspicious activity patterns, indicating that the computing system may be compromised, may require the monitoring processes to perform, or cause other processes to perform, prompt remediation responses. Examples of remediation responses may include reboots or shutdowns of the computing system; containment or closure of open network connections of the computing system; termination of running code such as applications or threads at the computing system; or other operations suitable to secure the computing system against damaging effects of incidents identified from monitored activity.

For the purpose of understanding examples of the present disclosure, the workings of the monitoring processes need not be described in further detail. It shall suffice to understand that in computing systems implementing concurrent processing, applications may generate and destroy concurrently running processes with high frequency, and monitoring of such short-lived processes may concurrently cause read access and write access to large quantities of data.

According to examples of the present disclosure, the lock scaling module 318 may configure the computing system(s) 300 to scale the number of locks of the lock primitives 308, as well as scale the number and the size of partitions of the partitioning structure 312 concomitantly. Lock scaling and partition scaling may each be triggered by scaling conditions set for one or more monitoring processes, and furthermore may each be triggered by manual input by operators of the computing system(s) 300. Details of lock scaling and partition scaling, as well as scaling conditions and manual input processes, are described subsequently.

In some instances, any or all of the devices and/or modules of the computing system(s) 300 may have features or functionality in addition to those that FIG. 3 illustrates.

The computing system(s) 300 may be configured to communicate over a telecommunications network using any common wireless and/or wired network access technology. Moreover, the computing system(s) 300 may be configured to run any compatible device OS, including but not limited to, Microsoft Windows Mobile, Google Android, Apple iOS, Linux Mobile, as well as any other common mobile device OS.

The computing system(s) 300 also can include input device(s) 326, such as a keypad, a cursor control, a touch-sensitive display, voice input device, etc., and output device(s) 328 such as a display, speakers, printers, etc. These devices are well known in the art and need not be discussed at length here. Input device(s) 316 may enable operators of the computing system(s) 300 to trigger lock scaling and partition scaling by manual input, as shall be described subsequently.

As illustrated in FIG. 3, the computing system(s) 300 also includes a network interface 330 that enables the computing system(s) 300 to communicate with other computing devices and remote network hosts.

Examples of scenarios wherein threads of a monitoring process may acquire locks over process resources as a result of resource requests are subsequently illustrated in FIGS. 4A through 4C; FIGS. 5A through 5C; and FIG. 6. These drawings illustrate steps by which threads may request resources, and access the requested resources, by acquiring locks in an indirectly mapped fashion as described above.

Figure 4A:
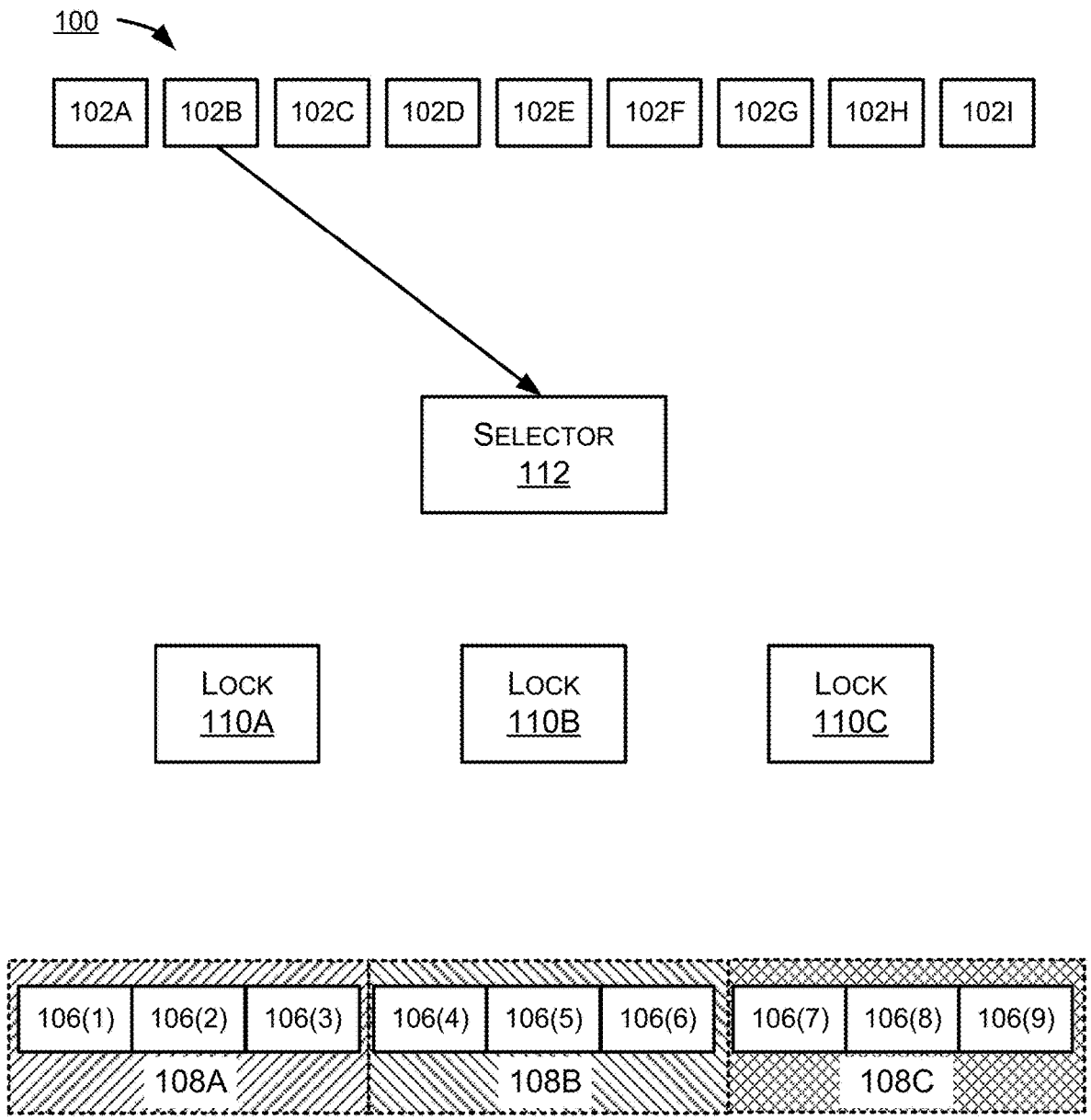
FIGS. 4A through 4C illustrate an example of a thread requesting a resource and acquiring a lock over a partition including the requested resource.
Figure 4B:
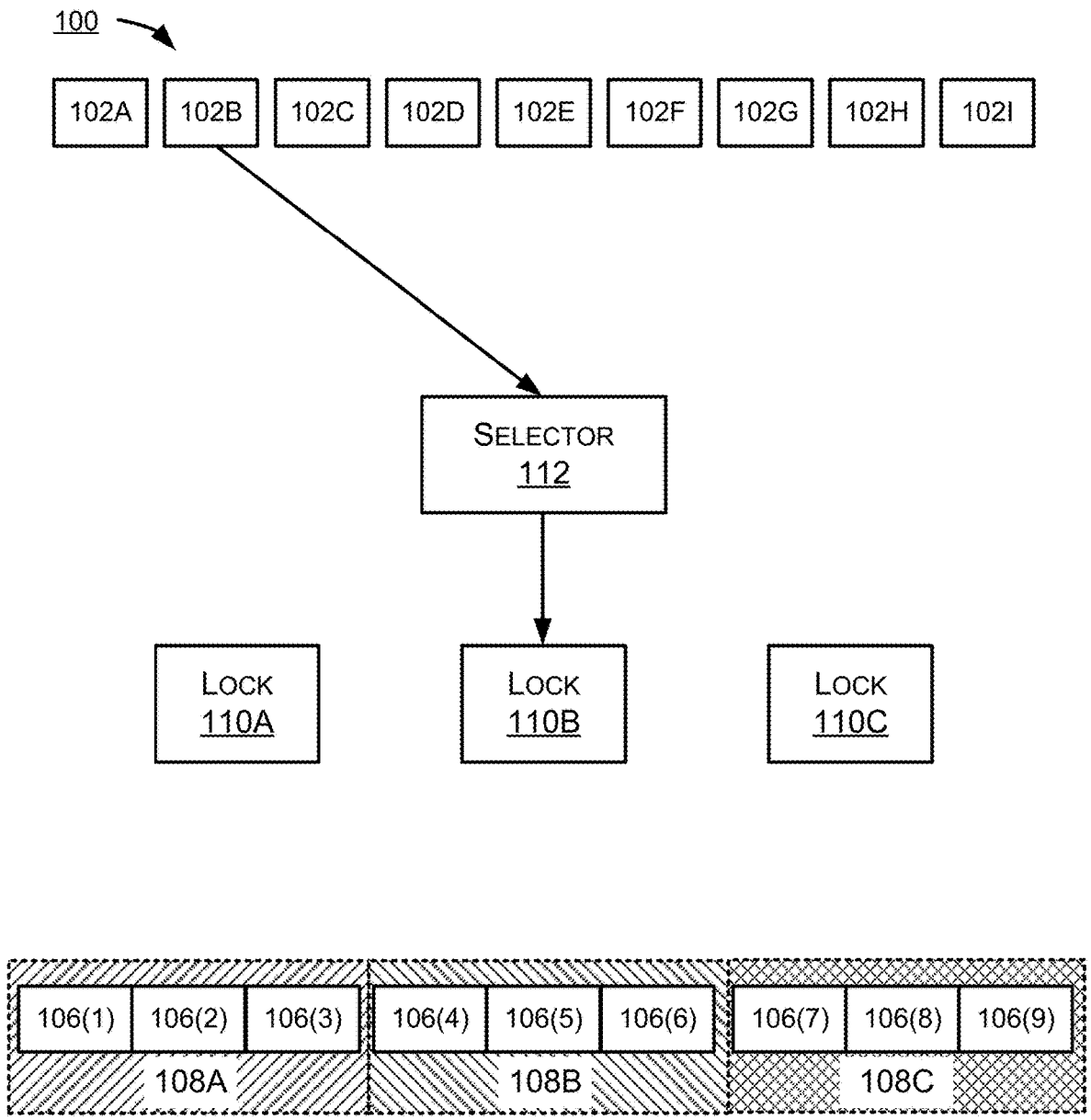
Figure 4C:
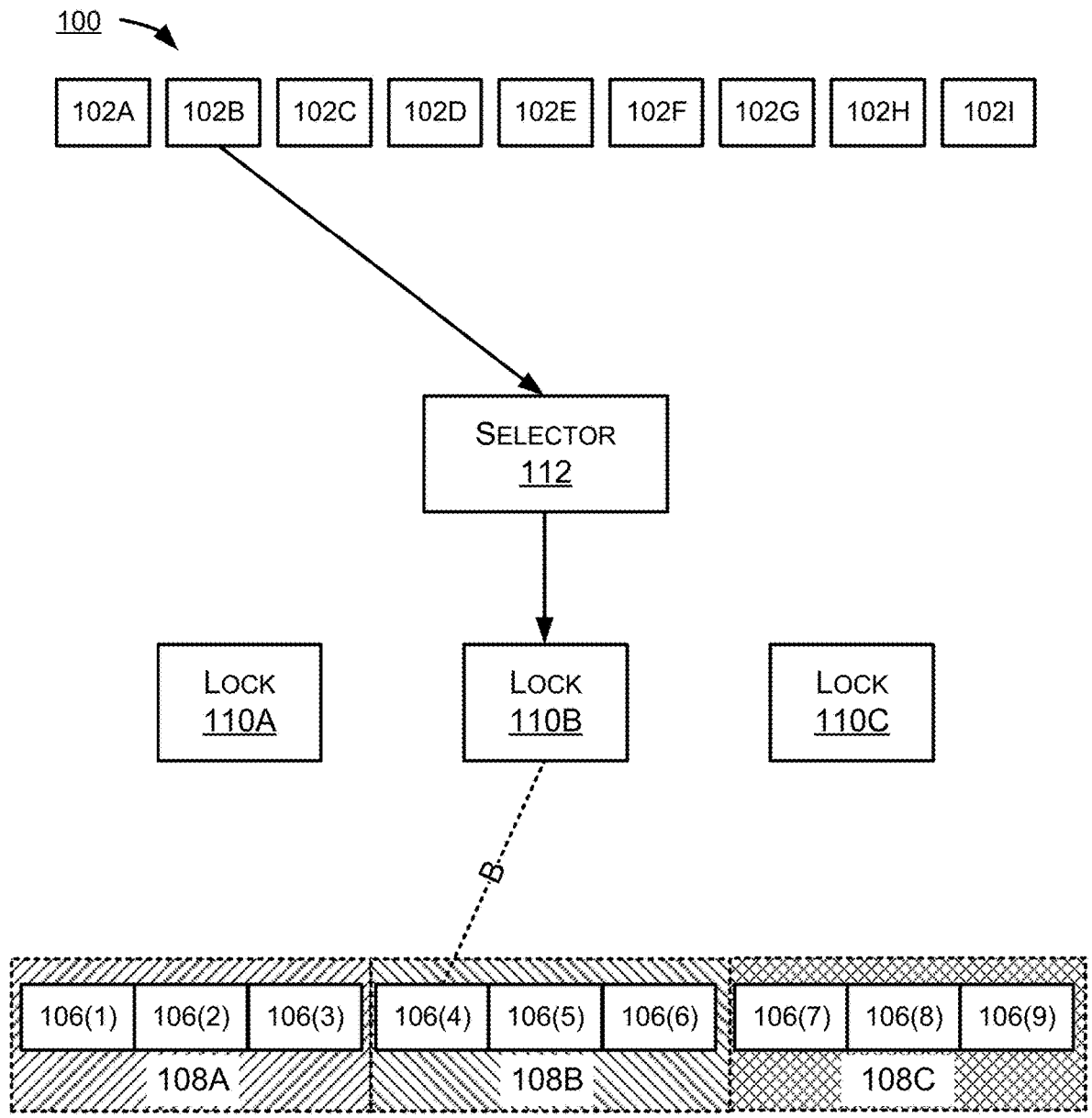
Figure 5A:
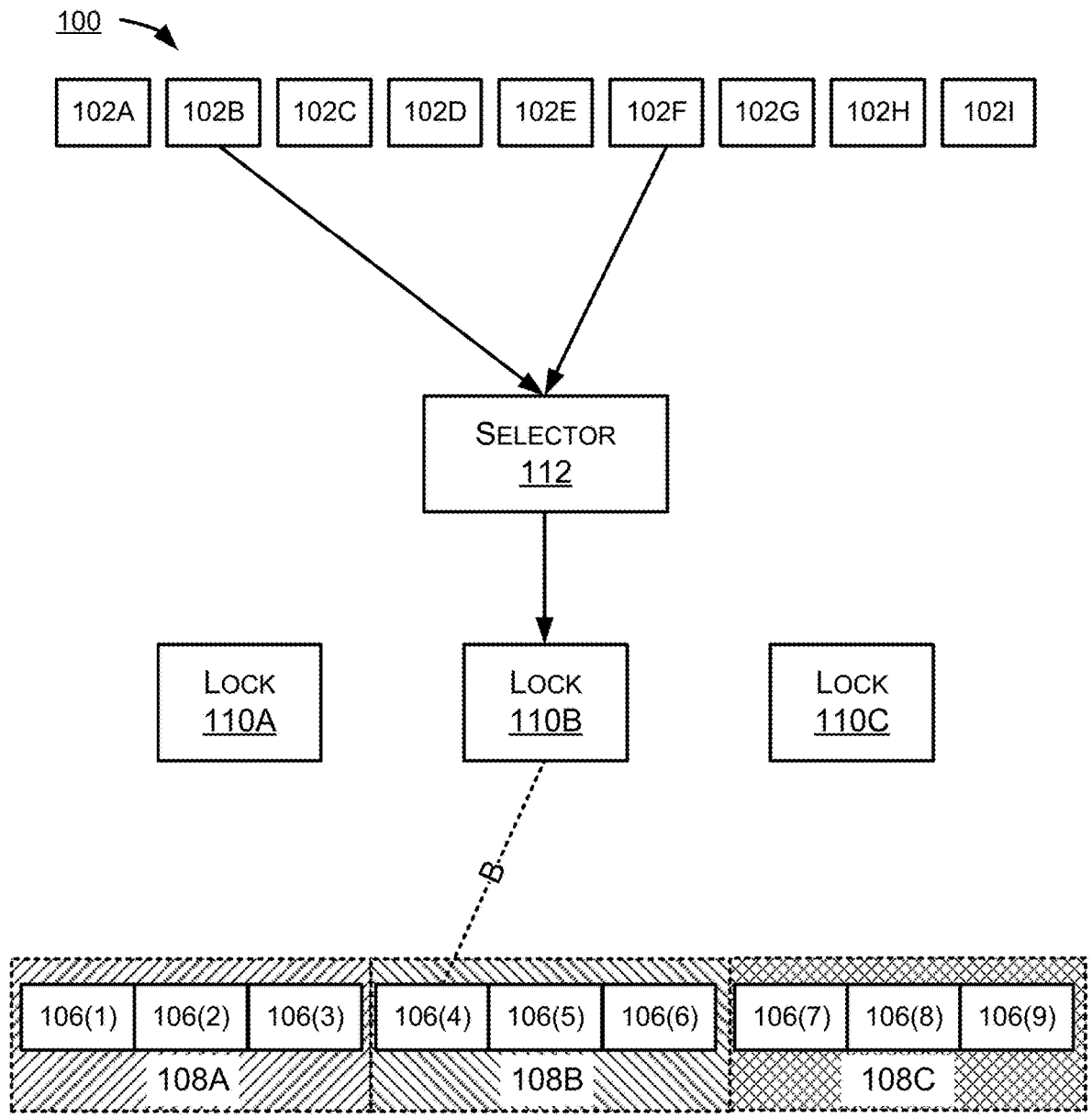
FIGS. 5A through 5C illustrate an example of multiple threads requesting multiple resources and acquiring multiple locks over multiple partitions including the requested resources.
Figure 5B:
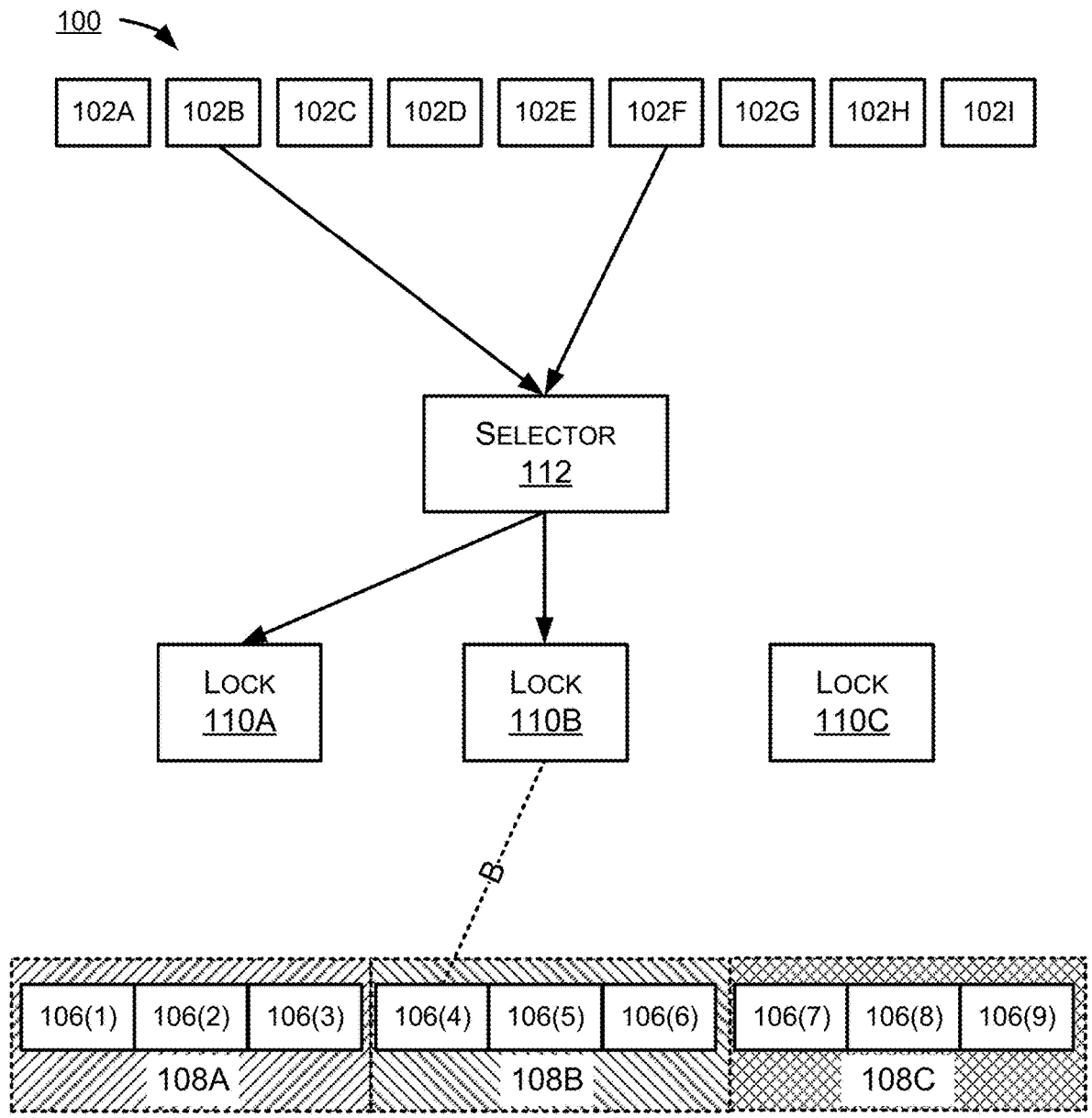
Figure 5C:
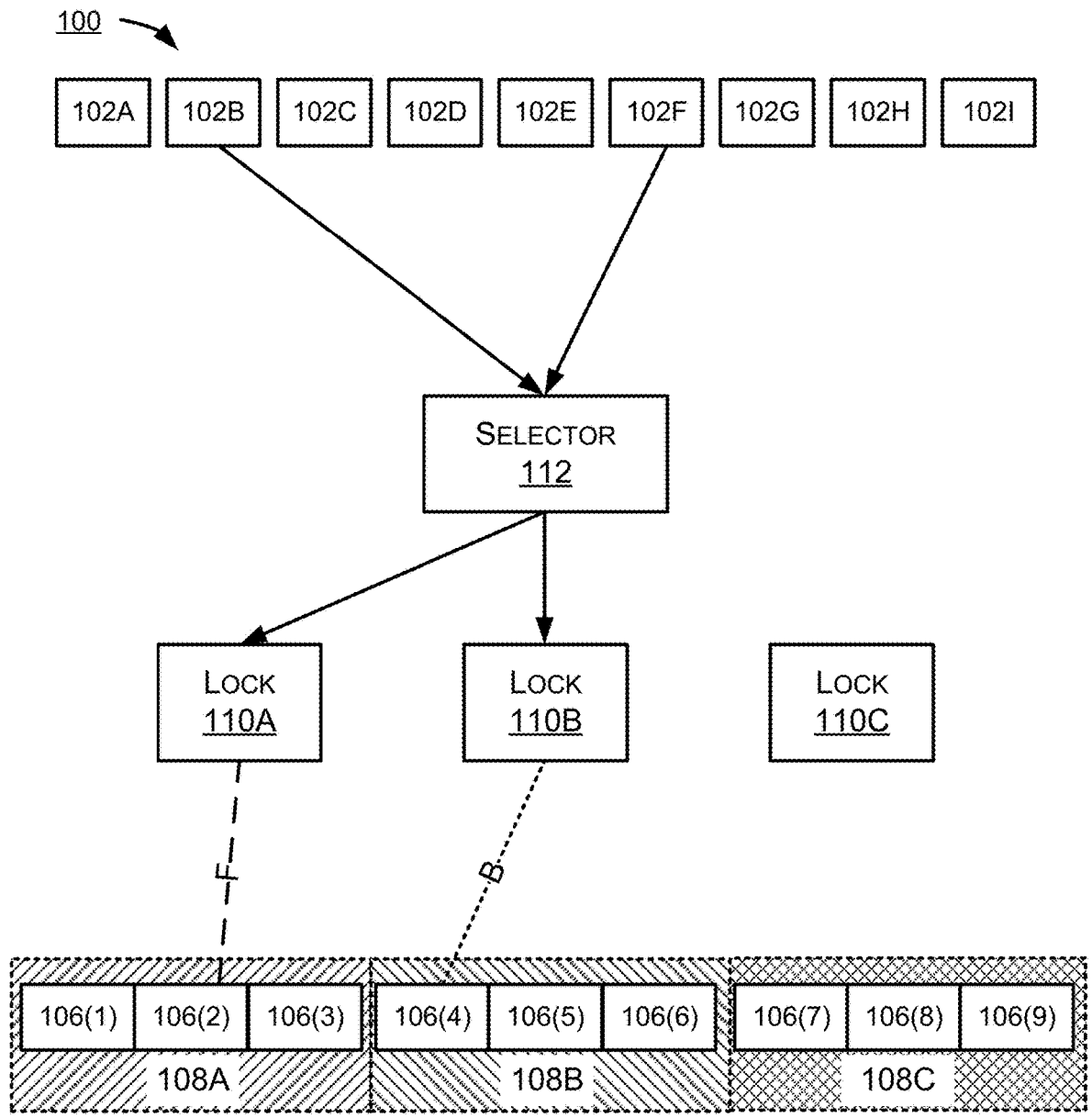

FIGS. 4A through 4C illustrate an example of a thread requesting a resource and acquiring a lock over a partition including the requested resource. The table 100 as configured above in FIG. 1 is used herein for the illustrative example.

As illustrated in FIG. 4A, a first thread of a monitoring process running on a processor of a computing system requests writing to a first resource of a table 100 by looking up a first key mapped to the first resource. By way of example, in FIG. 4A, the first thread looks up a key 102B. The lookup of the key 102B causes the key 102B to be forwarded to the selector 112. The selector 112 then maps the key 102B to one of the locks 110A, 110B, or 110C, such as by the output of a pseudorandom deterministic function receiving the key 102B as input.

As illustrated in FIG. 4B, the selector indirectly maps the key 102B to the lock 110B. For example, the deterministic output of the pseudorandom deterministic function for the key 102B input may be a numeric output which is consistently mapped to the key 102B. For example, the output of the pseudorandom deterministic function may be divided by the number of locks by the modulus operation. The modulus operation may output 0, 1, or 2, which may each be mapped to one of the locks 110A, 110B, or 110C.

As illustrated in FIG. 4C, by the selector indirectly mapping the key 102B to the lock 110B, the first thread acquires the lock 110B to access a first resource mapped to the key 102B. No contention occurs for any of the locks 110A, 110B, or 110C. The first thread has exclusive write access to the partition 108B for as long as it holds the lock 110B, and lock contention may result if any other thread requests writing to any other resource in partition 108B while the lock 110B is held. However, while the lock 110B is held, the other locks 110A and 110C may each be exclusively acquired by other threads requesting writes to resources of partitions 108A or 108C.

FIGS. 5A through 5C illustrate an example of multiple threads requesting multiple resources and acquiring multiple locks over multiple partitions including the requested resources. The table 100 as configured above in FIG. 1 is used herein for the illustrative example.

As illustrated in FIG. 5A, as in FIGS. 4A through 4C, a first thread of a monitoring process running on a processor of a computing system has already requested writing to a first resource of a table 100 by looking up a first key mapped to the first resource. The request has already been granted upon the first thread acquiring the lock 110B over the partition 108B.

Additionally, as illustrated in FIG. 5A, a second thread of the monitoring process running on a processor of the computing system requests writing to a second resource of the table 100 by looking up a second key mapped to the second resource. By way of example, in FIG. 5A, the second thread looks up a key 102F. The lookup of the key 102F causes the key 102F to be forwarded to the selector 112. The selector 112 then maps the key 102F to one of the locks 110A, 110B, or 110C, such as by the output of a pseudorandom deterministic function receiving the key 102F as input.

As illustrated in FIG. 5B, the selector indirectly maps the key 102F to the lock 110A. For example, the deterministic output of the pseudorandom deterministic function for the key 102F input may be a numeric output which is consistently mapped to the key 102F. For example, the output of the pseudorandom deterministic function may be divided by the number of locks by the modulus operation. The modulus operation may output 0, 1, or 2, which may each be mapped to one of the locks 110A, 110B, or 110C.

As illustrated in FIG. 5C, by the selector indirectly mapping the key 102F to the lock 110A, the second thread acquires the lock 110A to access a second resource mapped to the key 102F. No contention occurs for any of the locks 110A, 110B, or 110C. The first thread retains exclusive write access to the partition 108B by holding the lock 110B as described with reference to FIGS. 4A through 4C. Meanwhile, the second thread has exclusive write access to the partition 108A for as long as it holds the lock 110A, and lock contention may result if any other thread requests writing to any other resource in partition 108A while the lock 110A is held. However, while the locks 110B and 110A are both held, the other lock 110C may be exclusively acquired by other threads requesting writes to resources of partition 108C.

Figure 6:
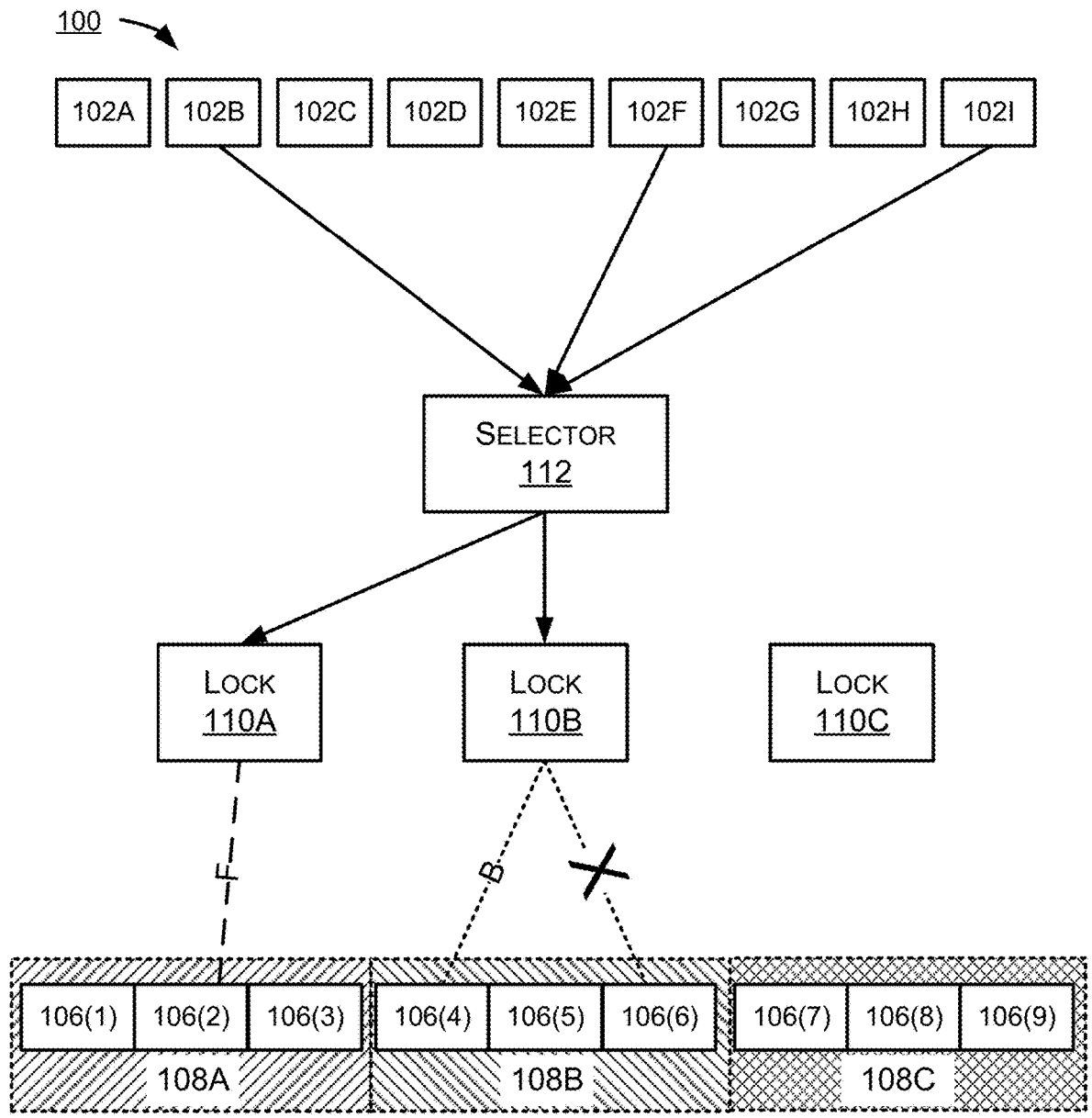
FIG. 6 illustrates an example of thread blocking as a result of multiple threads requesting multiple resources and acquiring multiple locks.

FIG. 6 illustrates an example of thread blocking as a result of multiple threads requesting multiple resources and acquiring multiple locks. The table 100 as configured above in FIG. 1 is used herein for the illustrative example.

As illustrated in FIG. 6, as in FIGS. 5A through 5C, a first thread of a monitoring process running on a processor of a computing system has already requested writing to a first resource of a table 100 by looking up a first key mapped to the first resource. The request has already been granted upon the first thread acquiring the lock 110B over the partition 108B. Furthermore, a second thread of the monitoring process running on a processor of the computing system has already requested writing to a second resource of the table 100 by looking up a second key mapped to the second resource. The request has already been granted upon the second thread acquiring the lock 110A over the partition 108A.

Additionally, as illustrated in FIG. 6, a third thread of the monitoring process running on a processor of the computing system requests writing to a third resource of the table 100 by looking up a third key mapped to the third resource. By way of example, in FIG. 6, the third thread looks up a key 102I. The lookup of the key 102I causes the key 102I to be forwarded to the selector 112. The selector 112 then maps the key 102I to one of the locks 110A, 110B, or 110C, such as by the output of a pseudorandom deterministic function receiving the key 102I as input.

As illustrated in FIG. 6, the selector indirectly maps the key 102I to the lock 110B. For example, the deterministic output of the pseudorandom deterministic function for the key 102I input may be a numeric output which is consistently mapped to the key 102I. For example, the output of the pseudorandom deterministic function may be divided by the number of locks by the modulus operation. The modulus operation may output 0, 1, or 2, which may each be mapped to one of the locks 110A, 110B, or 110C.

As illustrated in FIG. 6, by the selector indirectly mapping the key 102I to the lock 110B, the third thread attempts to acquire the lock 110B to access a third resource mapped to the key 102I. The first thread retains exclusive write access to the partition 108B by holding the lock 110B as described with reference to FIGS. 5A through 5C. Contention now occurs for the lock 110B (illustrated by a large X through the mapping from the lock 110B to the resource 106(6)), since the first thread has already acquired the lock 110B as described above with reference to FIGS. 4A through 4C. Meanwhile, the second thread has exclusive write access to the partition 108A for as long as it holds the lock 110A, and lock contention may result if any other thread requests writing to any other resource in partition 108A while the lock 110A is held. Additionally, while the locks 110B and 110A are both held, the other lock 110C may be exclusively acquired by other threads requesting writes to resources of partition 108C.

Upon lock contention occurring as described above, a monitoring process may track the degree of lock contention occurring overall at threads of the monitoring process. Degree of lock contention may be referenced in lock scaling and partition scaling, as shall be described subsequently.

According to examples of the present disclosure wherein locks are implemented as read-write locks, a thread may acquire a lock as a reader thread or may acquire a lock as a writer thread. A thread may acquire a lock as a writer thread as described above with reference to FIGS. 4A through 4C and FIGS. 5A and 5C, but may instead acquire a lock as a reader thread in the event that the thread requests to read a resource instead of writing to the resource.

Read-write locks according to examples of the present disclosure may not enforce exclusive read access to resources, but may still enforce exclusive write access to resources. In other words, while a lock is acquired by a writer thread, no other threads may acquire the lock as either a reader thread or a writer thread; however, while a lock is acquired by a reader thread, other threads may concurrently acquire the lock as reader threads, but no thread may acquire the lock as a writer thread.

Consequently, according to the above example of FIG. 6, if the first thread had acquired the lock 110B as a reader thread rather than a writer thread (contrary to the illustration of FIGS. 4A through 4C), the first thread acquiring the lock 110B would still have resulted in lock contention upon the third thread attempting to acquire the lock 110B as a writer thread. Likewise, if the third thread were attempting to acquire the lock 110B as a reader thread rather than a writer thread, while the first thread has acquired the lock 110B as a writer thread, the lock may, or may not, prevent the third thread from acquiring the lock 110B, depending on varying implementations of read-write locks. However, if the third thread were attempting to acquire the lock 110B as a reader thread while the first thread has acquired the lock 110B as a reader thread, the lock would not result in lock contention upon the third thread attempting to acquire the lock 110B as a reader thread.

Furthermore, a lock scaling module may perform lock scaling and partition scaling as described above to cause the number of locks, and the number and the size of partitions, to be adjusted concomitantly during operation of the monitoring processes. Lock scaling and partition scaling may each be performed according to degree of lock contention occurring at process resources, such as a table 100, tracked by a lock scaling module during execution of each thread of the monitoring process as described above. Upon a degree of lock contention exceeding an upward scaling condition, the lock scaling module may trigger upward lock scaling upon lock primitives of the process resources, and may trigger upward partition scaling upon a partitioning structure of the process resources. Upon a degree of lock contention exceeding a downward scaling condition, the lock scaling module may trigger downward lock scaling upon lock primitives of the process resources, and may trigger downward partition scaling upon a partitioning structure of the process resources.

For example, an upward scaling condition may be a degree of lock contention permitting tolerable real-time responsiveness of the monitoring process in contributing to real-time security monitoring. In other words, the degree of lock contention generally does not cause remediation of malicious activity to become untimely so as to cause damage to the computing system. A downward scaling condition, in contrast, may be a degree of lock contention permitting real-time responsiveness of the monitoring process in contributing to real-time security monitoring while leaving additional computational resources, such as processor cores and memory, unoccupied.

The magnitudes of the upward and downward scaling conditions may be experimentally determined based on routine operation of a computing system, and may be particular to computational power specifications of each different computing system. The magnitudes of the upward and downward scaling conditions may also be manually input by operators of the computing system during routine execution of the monitoring processes on the computing system, through input device(s) of the computing system as described above.

Upward lock scaling may be performed by the lock scaling module increasing the number of locks of the lock primitives, and upward partition scaling may be performed by the lock scaling module increasing the number of partitions of the partitioning structure. As a consequence of a function of the selector as described above (such as a pseudorandom deterministic function) indirectly mapping keys approximately evenly across the several locks and partitions, increasing the number of partitions may cause the number of resources in each partition to decrease approximately evenly, in proportion to the extent of increase in the number of partitions.

Downward lock scaling may be performed by the lock scaling module decreasing the number of locks of the lock primitives, and downward partition scaling may be performed by the lock scaling module decreasing the number of partitions of the partitioning structure. As a consequence of a function of the selector as described above (such as a pseudorandom deterministic function) indirectly mapping keys approximately evenly across the several locks and partitions, decreasing the number of partitions may cause the number of resources in each partition to increase approximately evenly, in proportion to the extent of decrease in the number of partitions.

FIGS. 1 and 2 above illustrate commensurate differences in number of locks and number of partitions, by way of example.

Moreover, upward lock scaling and upward partition scaling, or downward lock scaling and downward partition scaling, may be triggered by commands to the monitoring processes manually input by an operator of the computing system during routine execution of the monitoring processes on the computing system, through input device(s) of the computing system as described above.

Figure 7:
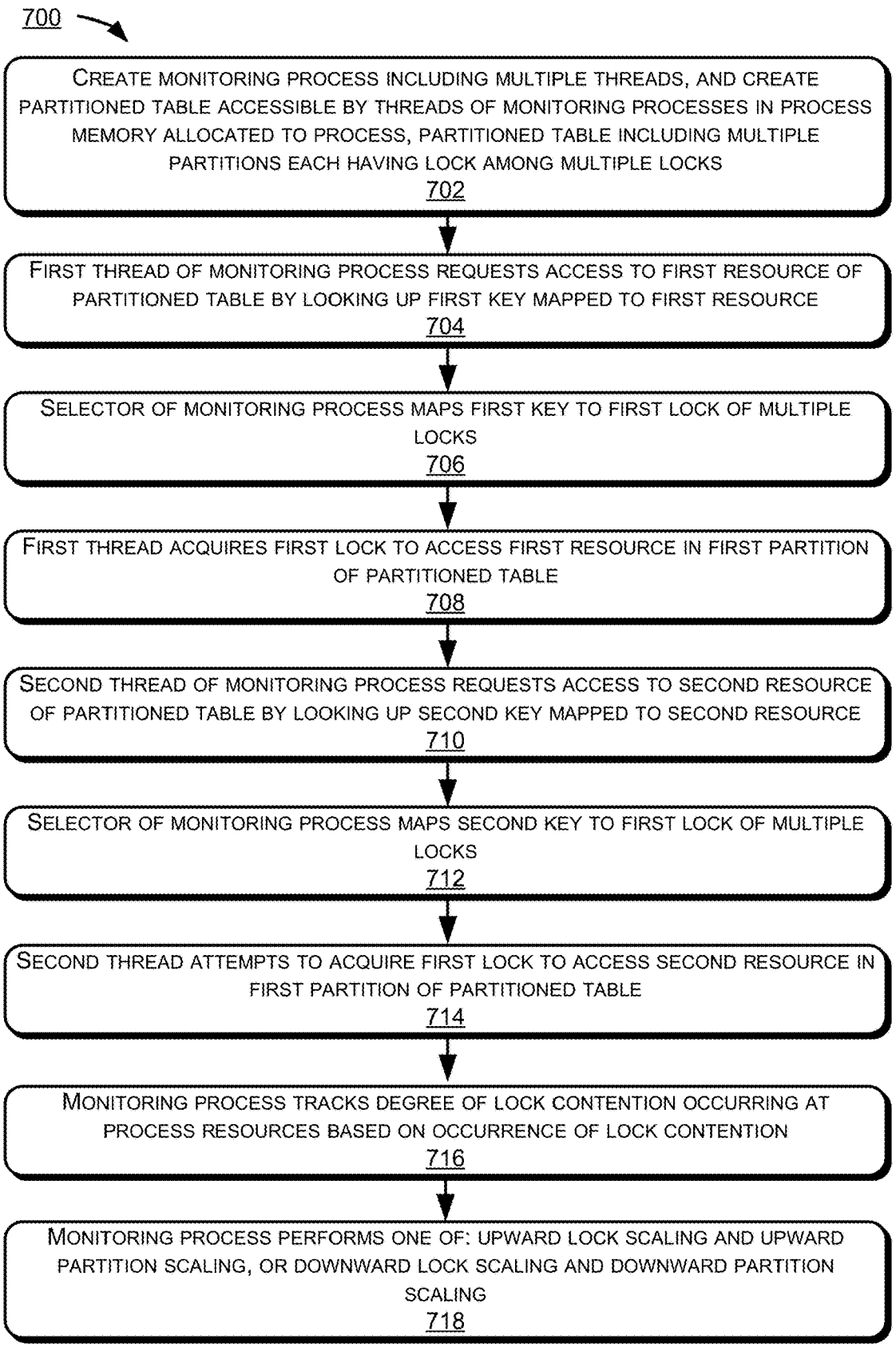
FIG. 7 illustrates a flowchart of a multiple locking of resources and lock scaling method according to examples of the present disclosure.

FIG. 7 illustrates a flowchart of a multiple locking of resources and lock scaling method 700 according to examples of the present disclosure.

In step 702 of the method 700, a processor of a computing system creates a monitoring process including multiple threads, and creates a partitioned table accessible by threads of the monitoring processes in process memory allocated to the process, the partitioned table including multiple partitions each having a lock among multiple locks. As described above with reference to FIG. 3, the process resources may include, for example, a key store, lock primitives, a resource store, a partitioning structure, and a mapping structure. The key store includes some number of keys, each key being unique. The mapping structure includes mappings of keys to resources of the resource store, including one such mapping for each key. Each mapping connects one key to one resource. All process resources may reside in the memory except that the key store may reside in local memory of processor(s).

The monitoring process may be created by execution of a computer-executable applications providing real-time security monitoring on the computing system, by tracking computational activity of other applications running on the same computing system. Data obtained by tracking such computational activity may be analyzed in real-time to identify malicious activity and perform remediation in response.

In computing systems implementing concurrent processing, applications may generate and destroy concurrently running processes with high frequency, and monitoring of such short-lived processes may concurrently cause read access and write access to large quantities of data. Thus, the monitoring process may collect large volumes of data regarding system events occurring in context of various other processes, causing threads of the monitoring process to make frequent write access and read access to resources of the process in memory.

In step 704 of the method 700, a first thread of the monitoring process requests access to a first resource of the partitioned table by looking up a first key mapped to the first resource.

In step 706 of the method 700, a selector of the monitoring process maps the first key to a first lock of the multiple locks.

The mapping may be performed by, for example, the output of a pseudorandom deterministic function receiving the key as input. For example, the deterministic output of the pseudorandom deterministic function for the key input may be a numeric output which is consistently mapped to the key. For example, the output of the pseudorandom deterministic function may be divided by the number of locks by the modulus operation.

In a step 708 of the method 700, the first thread acquires the first lock to access the first resource in a first partition of the partitioned table. This is enabled by the selector indirectly mapping the first key to the first lock.

The first thread may acquire the first lock as a reader thread or as a writing thread. In the event that the first thread acquires the first lock as a reader thread, depending on the implementation of locks according to examples of the present disclosure, the first thread may not have exclusive read access to a partition containing the first resource; lock contention may not result if any other thread requests reading from any other resource in the partition; and, furthermore, according to the implementation of read-write locks as described above, though lock contention may result if any other thread requests writing to any other resource in the partition, lock contention may not result if any other thread requests writing to any resource in any other partition of the partitioned table.

In the event that the first thread acquires the first lock as a writer thread, the first thread has exclusive write access to the partition containing the first resource for as long as it holds the first lock; lock contention may result if any other thread requests reading from or writing to any other resource in the partition while the first lock is held. However, while the first lock is held, any of the other locks may each be non-exclusively or exclusively acquired by other threads requesting reads from or writes to resources of other partitions.

In a step 710 of the method 700, a second thread of the monitoring process requests access to a second resource of the partitioned table by looking up a second key mapped to the second resource.

In a step 712 of the method 700, the selector maps the second key to the first lock.

In a step 714 of the method 700, the second thread attempts to acquire the first lock to access the second resource in the first partition of the partitioned table. This is enabled by the selector indirectly mapping the second key to the first lock, but causes lock contention at the first lock, and causes the second thread to become blocked.

In a step 716 of the method 700, the monitoring process tracks degree of lock contention occurring at the process resources based on the occurrence of lock contention.

In a step 718 of the method 700, a lock scaling module performs one of: upward lock scaling and upward partition scaling, or downward lock scaling and downward partition scaling, based on the degree of lock contention, an upward scaling condition, and a downward scaling condition.

Lock scaling and partition scaling as described above may cause the number of locks, and the number and the size of partitions, to be adjusted concomitantly during operation of the monitoring processes. Upon a degree of lock contention exceeding an upward scaling condition, the lock scaling module may trigger upward lock scaling upon lock primitives of the process resources, and may trigger upward partition scaling upon a partitioning structure of the process resources. Upon a degree of lock contention exceeding a downward scaling condition, the lock scaling module may trigger downward lock scaling upon lock primitives of the process resources, and may trigger downward partition scaling upon a partitioning structure of the process resources.

As described above, an upward scaling condition may be a degree of lock contention permitting tolerable real-time responsiveness of the monitoring process in contributing to real-time security monitoring. A downward scaling condition, in contrast, may be a degree of lock contention permitting real-time responsiveness of the monitoring process in contributing to real-time security monitoring while leaving additional computational resources, such as processor cores and memory, unoccupied. Such changes in degrees of lock contention may occur as a result of the first thread acquiring the first lock during step 708 as described above, as a result of the second thread acquiring the second lock during step 714 as described above, or as a result of any other thread acquiring any other lock at any other time.

As described above, the magnitudes of the upward and downward scaling conditions may be experimentally determined based on routine operation of a computing system, and/or may also be manually input by operators of the computing system during routine execution of the monitoring processes on the computing system. The computing system may be configured with magnitudes of the upward and downward scaling conditions being set prior to the step 702 as described above; furthermore, the computing system may be configured with magnitudes of the upward and downward scaling conditions being set to new values at any time.

As described above, upward lock scaling may be performed by the lock scaling module increasing the number of locks of the lock primitives, and upward partition scaling may be performed by the lock scaling module increasing the number of partitions of the partitioning structure. As described above, increasing the number of partitions may cause the number of resources in each partition to decrease approximately evenly, in proportion to the extent of increase in the number of partitions.

Downward lock scaling may be performed by the lock scaling module decreasing the number of locks of the lock primitives, and downward partition scaling may be performed by the lock scaling module decreasing the number of partitions of the partitioning structure. As described above, decreasing the number of partitions may cause the number of resources in each partition to increase approximately evenly, in proportion to the extent of decrease in the number of partitions.

Moreover, step 718 (whether entailing upward lock scaling and upward partition scaling, or entailing downward lock scaling and downward partition scaling) may be triggered by commands to the lock scaling module manually input by an operator of the computing system during routine execution of the monitoring processes on the computing system, through input device(s) of the computing system as described above.

More particularly, the computing system may display monitored activity of the computing system in one or more views on one or more output device(s) of the computing system. The computing system may show user interfaces, views, graphics, visualizations, notifications, and the like on one or more output device(s) viewable by a human operator of the computing system. User interfaces, views, graphics, visualizations and the like may present activity patterns and/or events in one or more views. Such information may alert a human operator to monitored activity and/or events pertaining to the computing system, and may furthermore inform a human operator of degree of lock contention as tracked by monitoring processes.

Based on inspecting user interfaces, views, graphics, visualizations, notifications, and the like on one or more output device(s) of the computing system, a human operator may make decisions regarding appropriate lock scaling and partition scaling to be enacted on the computing system, and may operate the computing system to input information at one or more user interfaces to cause the computing system to send commands to one or more monitoring processes, such as a magnitude of the upward and downward scaling conditions, or a command to trigger upward lock scaling and upward partition scaling, or downward lock scaling and downward partition scaling.

By way of example and without limitation, the computing system may display historical degree of lock contention associated with the computing system for viewing and manual analysis by a human operator. Thus, the human operator may determine whether current degree of lock contention is abnormal or not, to assist in deciding appropriate lock scaling and partition scaling to be enacted.

An operator may install and subsequently execute a real-time security monitoring application at a computing system to monitor and record activity and patterns in application execution at the computing system, in an effort to detect, prevent, and mitigate damage from malware or malicious attack. Upon installation on a computing system, monitoring processes may be executed to detect, record, and analyze activity on the computing system, for purposes of detecting, preventing, and/or defeating malware and attacks. The real-time security monitoring application resides on the computing system to enable a detection loop that is aimed at defeating possible attacks.

Figure 8A:
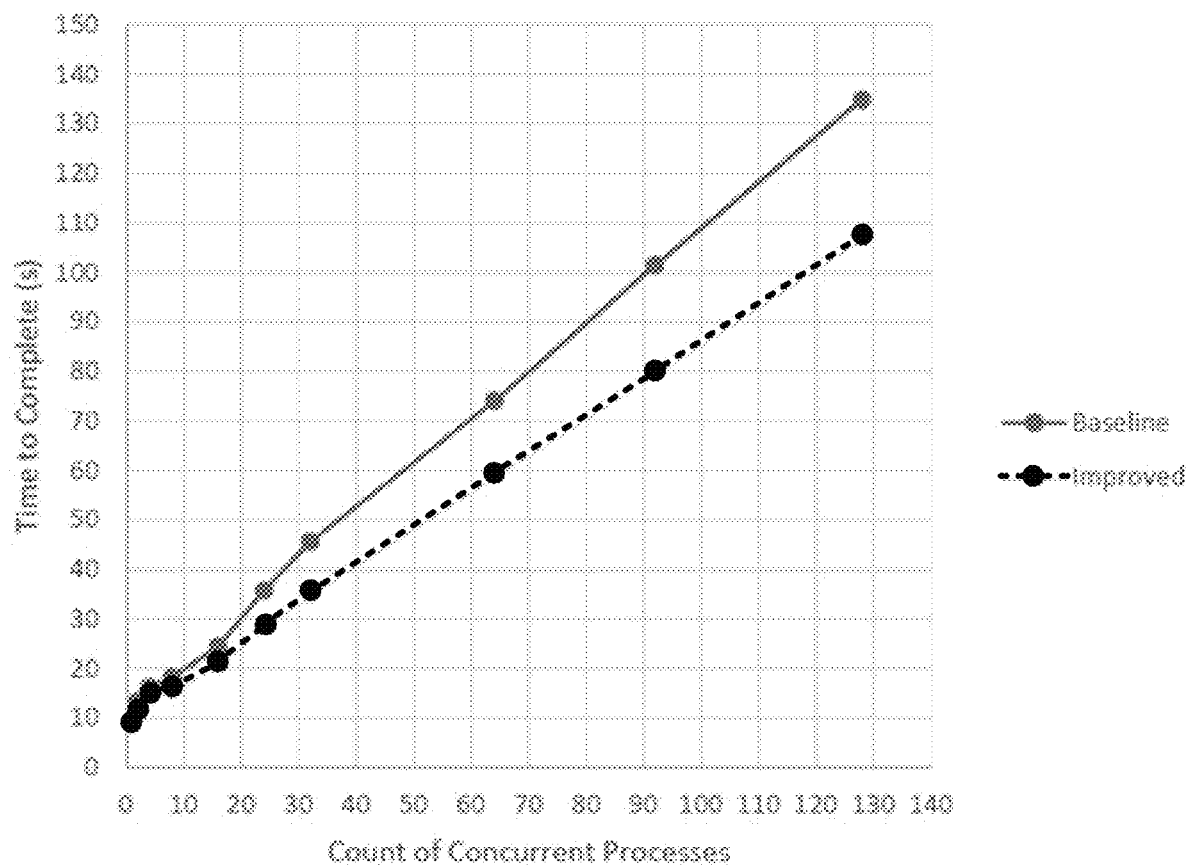
FIGS. 8A and 8B illustrate performance metrics of multiple locking of resources and lock scaling according to examples of the present disclosure, upon a computing system running concurrent processes.
Figure 8B:
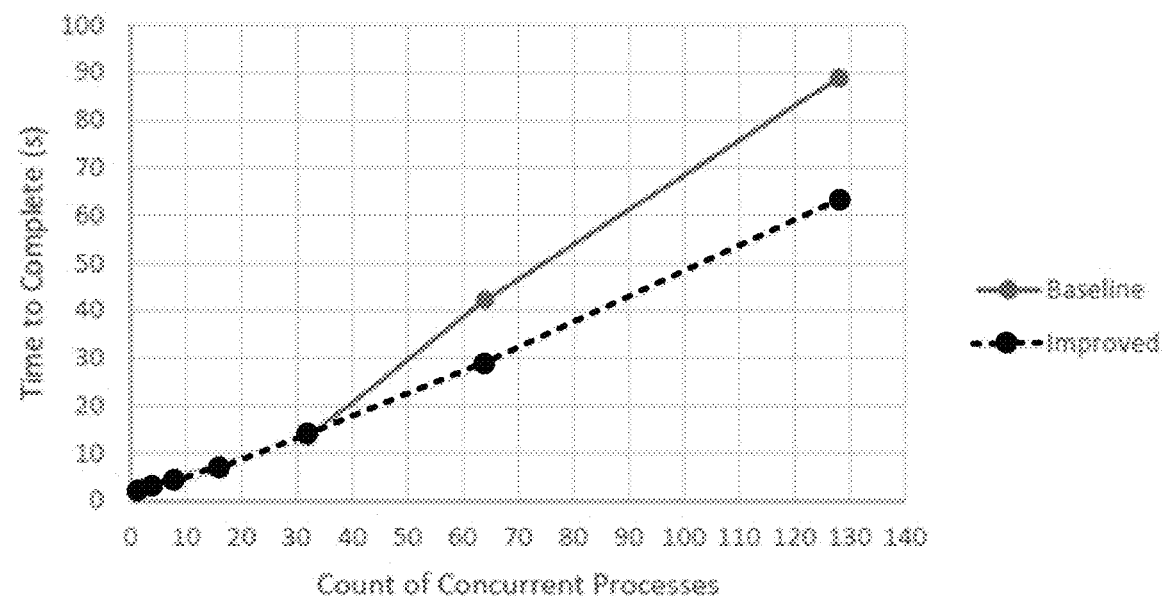

FIGS. 8A and 8B illustrate performance metrics of multiple locking of resources and lock scaling according to examples of the present disclosure, upon a computing system running concurrent processes. For comparative purposes, FIG. 8A illustrates performance metrics measured for a Windows Server 2012R2 host with 32 vCPUs, while FIG. 8B illustrates performance metrics measured for a Windows Server 2016 host with 80 vCPUs. Both computing systems included substantial system memory in accordance with practical deployments (32 GB), and exhibited stable memory usage to minimize paging.

Both computing systems were configured to create and destroy numerous concurrent processes while running a monitoring process according to examples of the present disclosure, providing minimal or no caching in intermediate memory layers so as to force the monitoring process to frequently access process resources in system memory. Thus, lock contention conditions are created to demonstrate performance metrics.

A maximum number of concurrent processes is determined as an experimental parameter. Each computing system was configured to create short-lived concurrent processes to perform light passive work. No file activities were performed to system storage, so that disk read and write overhead is held substantially minimal as a constant. Each of the short-lived concurrent processes was terminated after completing its work. The above process was then repeated for 100,000 iterations overall.

In each of FIG. 8A and FIG. 8B, baseline measurements were taken according to conventional implementations of locks over non-partitioned process resource tables. Improved measurements were taken according to examples of the present disclosure implementing multiple locking of resources and lock scaling. Measurements were taken for average time to complete tasks of the short-lived concurrent processes. Baseline measurements are illustrated in solid lines, while improved measurements are illustrated in broken lines.

These performance metrics demonstrate that, as number of concurrent processes increases, examples of the present disclosure outperform conventional locking implementations, with time to complete, in each example, growing at a significantly smaller rate for according to examples of the present disclosure than conventional locking. Implemented in practice examples of the present disclosure have alleviated performance issues due to lock contention in resource stores of monitoring processes, with positive gains on Windows, Linux, and Mac platforms, and demonstrated stability under system resource constraints.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   creating a monitoring process comprising a plurality of threads;
   creating a partitioned table of resources accessible by threads of the monitoring process in process memory allocated to the monitoring process, the partitioned table comprising a plurality of partitions;
   mapping each of a plurality of keys of the partitioned table to a resource of the partitioned table;
   in response to a thread of the monitoring process requesting access to a resource of the partitioned table, inputting a key mapped to the resource into a pseudorandom deterministic function to yield an output, and performing a modulus operation upon the output by a count of the plurality of locks to yield a first lock of the plurality of locks;
   tracking, by the monitoring process, degree of lock contention at the resources;
   performing, by the monitoring process, one of increasing or decreasing the plurality of locks and plurality of partitions in number based on the degree of lock contention; and
   in response to the thread requesting access to the resource, inputting the key into the pseudorandom deterministic function to yield the output, and performing the modulus operation upon the output by an increased or decreased count of the plurality of locks to yield a second lock of the plurality of locks.

2. The method of claim 1, further comprising acquiring, by the thread, the first lock to access the resource in a first partition of the partitioned table after the modulus operation yields the first lock.

3. The method of claim 2, further comprising:
acquiring, by the second thread, to acquire the second lock to access the resource in a second partition of the partitioned table after the modulus operation yields the second lock.

4. The method of claim 3, further comprising performing, by the monitoring process, one of upward lock scaling or downward lock scaling, based on the degree of lock contention, an upward scaling condition, and a downward scaling condition.

5. A system comprising:
one or more processors; and
memory communicatively coupled to the one or more processors, the memory storing computer-executable modules executable by the one or more processors that, when executed by the one or more processors, perform associated operations, the computer-executable modules comprising:
a monitoring process module configured to create a plurality of threads;
a resource store comprising a partitioned table of resources accessible by threads of the monitoring process module in process memory allocated to the monitoring process module, the partitioned table comprising a plurality of partitions;
a mapping structure comprising mappings of each of a plurality of keys to resources of the partitioned table; and
a selector module configured to, in response to a thread of the monitoring process module requesting access to a resource of the partitioned table, input a key mapped to the resource into a pseudorandom deterministic function to yield an output, perform a modulus operation upon the output by a count of the plurality of locks to yield a first lock of the plurality of locks, and perform the modulus operation upon the output by an increased or decreased count of the plurality of locks to yield a second lock of the plurality of locks;
wherein the monitoring process module is further configured to track degree of lock contention at the resources, and to perform one of increasing or decreasing the plurality of locks and plurality of partitions in number based on the degree of lock contention.

6. The system of claim 5, wherein the monitoring process module is further configured to acquire, by the thread, the first lock to access the resource in a first partition of the partitioned table after the modulus operation yields the first lock.

7. The system of claim 6, wherein the monitoring process module is further configured to
acquire, by the thread, the second lock to access the resource in a second partition of the partitioned table after the modulus operation yields the second lock.

8. The system of claim 7, further comprising a lock scaling module configured to perform one of upward lock scaling or downward lock scaling, based on the degree of lock contention, an upward scaling condition, and a downward scaling condition.

9. A non-transitory computer-readable storage medium storing computer-readable instructions executable by one or more processors, that when executed by the one or more processors, cause the one or more processors to perform operations comprising:
creating a monitoring process comprising a plurality of threads; and
creating a partitioned table of resources accessible by threads of the monitoring process in process memory allocated to the monitoring process, the partitioned table comprising a plurality of partitions;
mapping each of a plurality of keys of the partitioned table to a resource of the partitioned table;
in response to a thread of the monitoring process requesting access to a resource of the partitioned table, inputting a key mapped to the resource into a pseudorandom deterministic function to yield an output, and performing a modulus operation upon the output by a count of the plurality of locks to yield a lock of the plurality of locks;
tracking, by the monitoring process, degree of lock contention at the resources;
performing, by the monitoring process, one of increasing or decreasing the plurality of locks and plurality of partitions in number based on the degree of lock contention; and
in response to the thread requesting access to the resource, inputting the key into the pseudorandom deterministic function to yield the output, and performing the modulus operation upon the output by an increased or decreased count of the plurality of locks to yield a second lock of the plurality of locks.

10. The non-transitory computer-readable storage medium of claim 9, wherein the operations further comprise acquiring, by the thread, the first lock to access the resource in a first partition of the partitioned table.

11. The non-transitory computer-readable storage medium of claim 10, wherein the operations further comprise:
requesting, by a second thread of the monitoring process, access to a second resource of the partitioned table by looking up a second key mapped to the second resource;
outputting, by the a second deterministic output corresponding to the first lock; and
attempting, by the second thread, to acquire the first lock to access the second resource in the first partition of the partitioned table.

12. The non-transitory computer-readable storage medium of claim 11, wherein the operations further comprise performing, by the monitoring process, one of upward lock scaling or downward lock scaling, based on the degree of lock contention, an upward scaling condition, and a downward scaling condition.

* * * * *